May 14, 1946. M. KATCHER 2,400,200
OIL FILTER
Filed Dec. 7, 1942 3 Sheets-Sheet 2
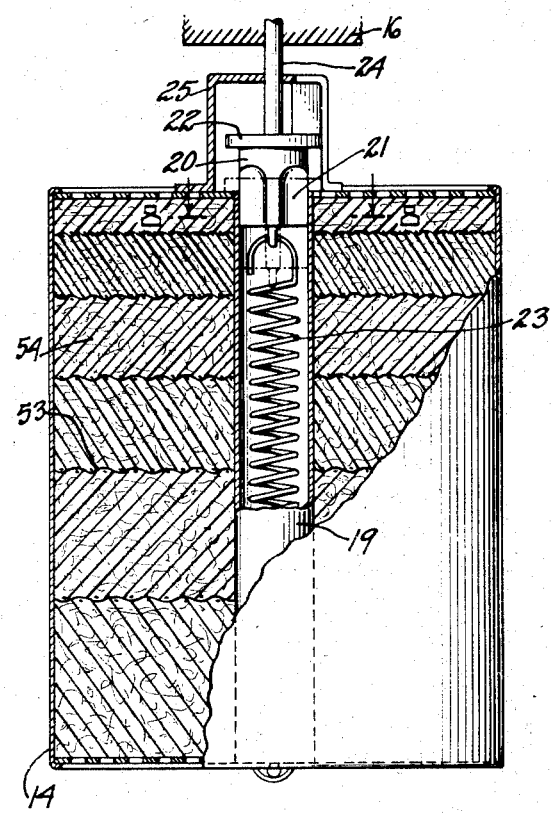
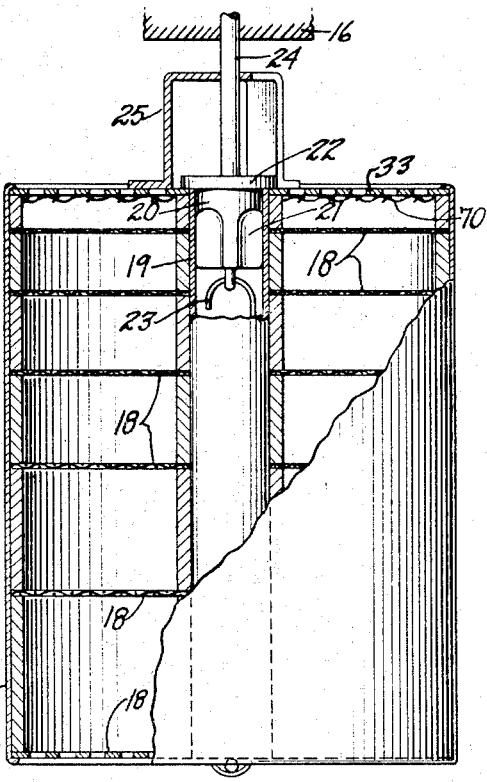
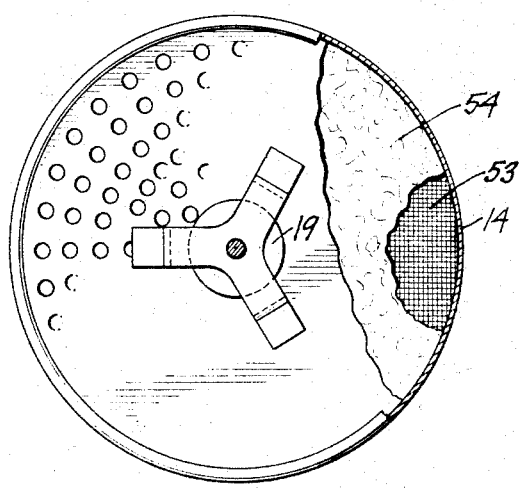
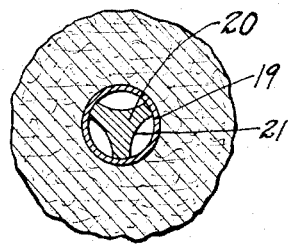
INVENTOR
MORRIS KATCHER.
BY
Emanuel Scheyer
ATTORNEY

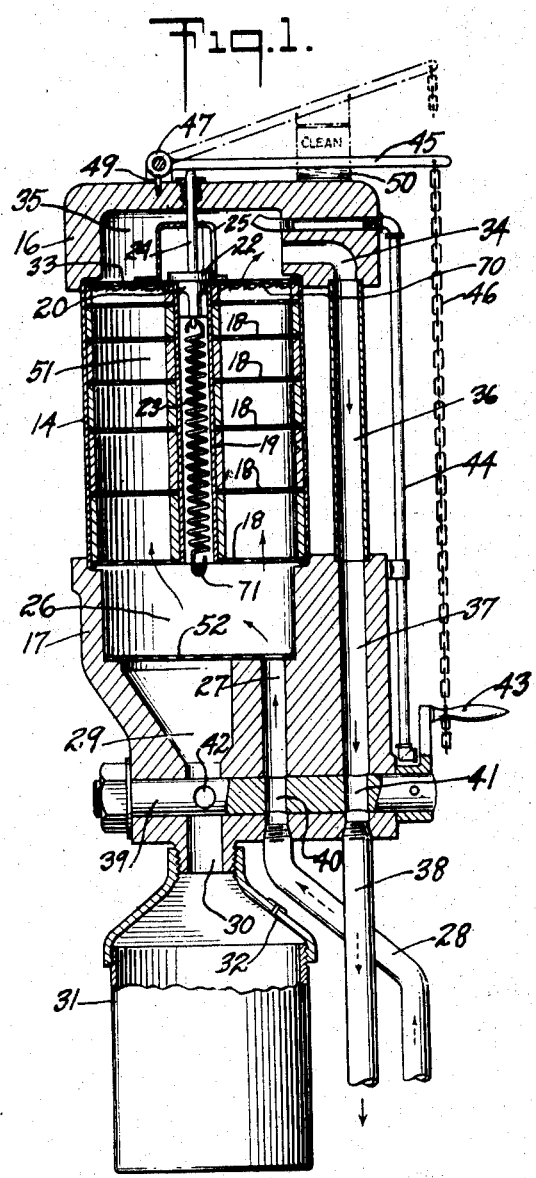

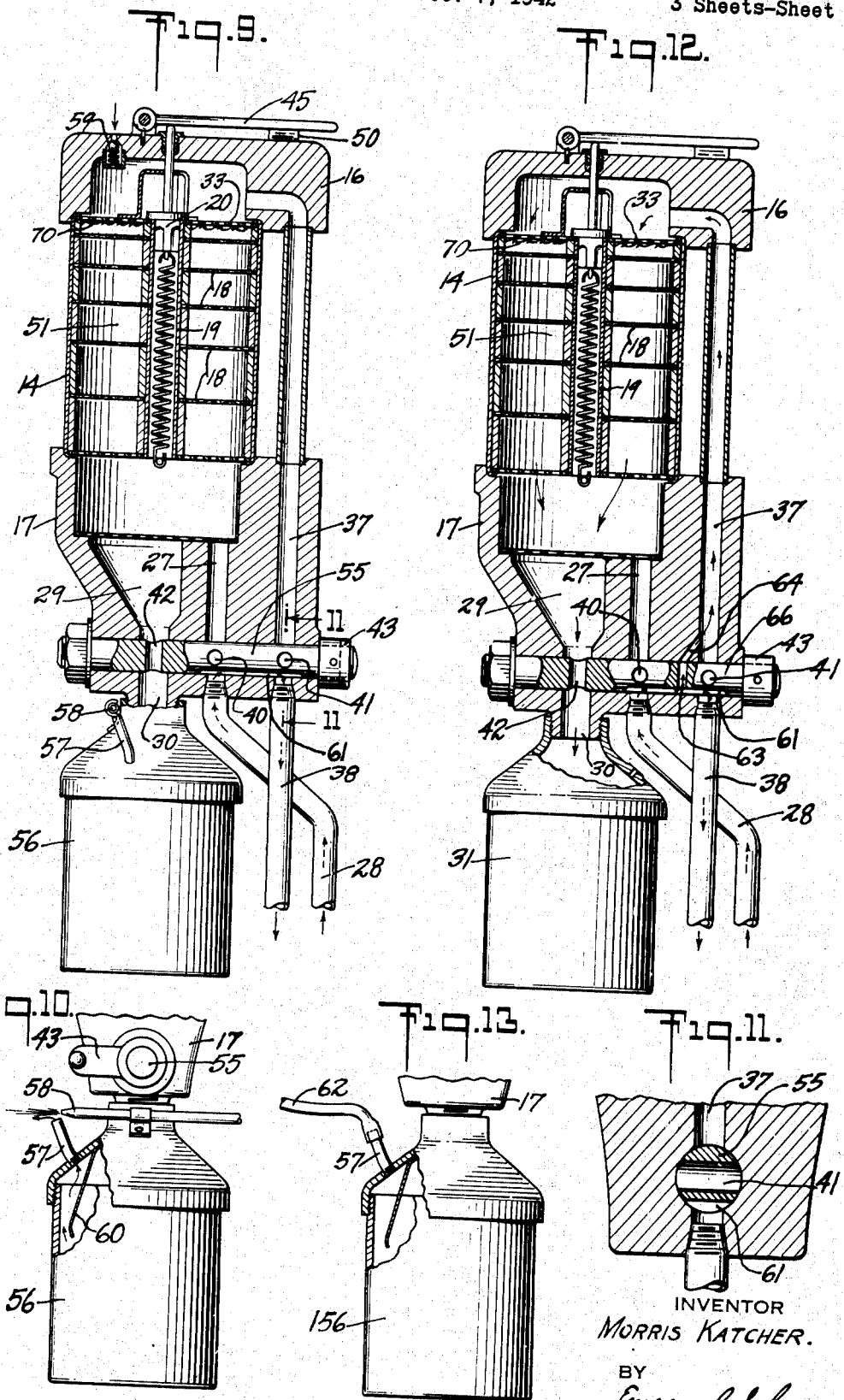

Patented May 14, 1946

2,400,200

UNITED STATES PATENT OFFICE 2,400,200

OIL FILTER

Morris Katcher, New York, N. Y.

Application December 7, 1942, Serial No. 468,044

4 Claims. (Cl. 210—167)

This invention relates to an oil filtering device which when clogged from filtering oil is adapted to be cleaned by causing a reverse flow of fluid through it. The filtering means or material in the filter is used over again, contrary to a type of present oil filter which uses a cartridge of filtering material which when choked is thrown away and a new one substituted therefor. The device is especially useful in the lubricating system of an internal combustion engine. The filtering means I prefer to use has openings, interstices or pores which become smaller the nearer the means is to where the oil leaves it, considering a flow of oil passing through the means. The finer particles of impurities in the oil as the latter normally flows through the means pass through the coarser openings in the means near where the oil enters until they reach openings small enough to stop them. Particles of larger size are stopped before they have traveled through the means as far as the finer particles. This variation in the size of the interstices also increases the filtering capacity of the means because it tends to prevent the smaller particles from clogging up the means at the side where the oil enters it by permitting said smaller particles to penetrate the means. By so penetrating they pass on away from the entrance until they are stopped by a small enough opening in the interior of the means. When the normal flow of oil is reversed through the means for cleaning it, the particles are enabled to leave it as they reach openings increasing in size on their way out. Instead of reversing the flow of oil from normal through said means, air may be blown through it in reverse direction to the normal flow. Other fluids besides air, such as kerosene, soap solutions and solvents or the like may be used for cleaning. Instead of forcing a fluid through the means by pressure to effect a reverse flow from normal, suction may be applied to the side of the means where the oil enters in its normal flow for causing a reverse flow and sucking the particles through the successively larger interstices. In one form of the device, the reverse flow through the means is effected through a special opening on the outlet side of the chamber in which the means is located, that is the side of the means where the oil leaves it. In another form where the filter is part of a pressure lubricating system, part of the oil from the lubricating system is sent in reverse direction through the filtering means or material. The filtering material may be granular filling material, or fibrous of say cellulosic fiber, or it may be screens set in spaced relation across the path of the flowing oil.

Mechanism is provided for the reversal of flow which at the same time cuts off the filtering chamber from sending fluid back to the lubricating system.

Many of the advantages of the filtering device are of use with other types of filtering means or material other than the means with interstices decreasing in size toward the side of said means where the oil leaves it.

While primarily designed for use in the lubricating system of an internal combustion engine, the device can be used for filtering purposes in other fields such as for cleaning air, the liquors in chemical processes or other suitable fluids carrying filterable particles.

Where the filter device is used in motor vehicles, it is convenient to use air to clean the device, as a source of compressed air is available in most service or gas stations.

Other objects and advantages will become apparent upon further study of the description and drawings, in which—

Fig. 1 is a vertical section through that form of the device, where fluid is forced into the chamber from its outlet side for cleaning, some parts being shown partially in elevation.

Fig. 2 is an elevation of the device taken at right angles to Fig. 1, the lower portion of the sludge receptacle being broken away.

Fig. 3 is a plan view looking down on the top of the device.

Fig. 4 is an enlarged partial section showing the detent for the pressure valve lever at the top of the filter.

Fig. 5 is an enlarged section, partially in elevation, of a filter assembly of the porous filling material type shown removed from the device.

Fig. 6 is an enlarged section, partially in elevation, of a filter assembly of the screen type shown removed from the device.

Fig. 7 is a bottom view of the filter assembly of Fig. 5 with portions of the successive layers broken away.

Fig. 8 is a partial section taken along the line 8—8 of Fig. 5.

Fig. 9 is a vertical section through a form of the device where air is sucked through by an injector from the inlet side of the chamber for cleaning, some parts being shown partially in elevation.

Fig. 10 is a partial elevation taken at the bottom of the device of Fig. 9 and at right angles thereto.

Fig. 11 is a partial section to an enlarged scale taken along the line 11—11 of Fig. 9.

Fig. 12 is a vertical section through a form of the device, some parts being shown partially in elevation, where the cleaning action is produced by a reversal of flow of the oil from the lubricating system, and Fig. 13 is a partial elevation taken similarly to Fig. 10 but shows a tube for connection with the intake manifold of the engine for suction.

In the device shown in Figs. 1–8, a sheet metal shell 14 is clamped by bolts 15 between castings 16 and 17 forming a housing enclosing a chamber 51. Extending transversely across shell 14 is a set of screens 18, the screen at the bottom having larger openings or interstices than the one next above it, and the next one above the latter having still smaller openings and so on up, each succeeding screen toward the top having smaller openings than the one just below it. Tube 19 extends through screens 18 from the bottom one to the top and forms a well or bypass of the screens. Slidably mounted at the top of tube 19 is a valve plug 20 whose side for its lower portion is provided with flutes 21, Figs. 5, 6 and 8. A valve collar 22 is formed on the top of valve plug 20 to prevent the latter from being pulled into tube 19 by the tension of spring 23. The top of spring 23 is hooked onto the bottom of plug 20 while the bottom of said spring is hooked about rod 71 which extends across the bottom of tube 19 and is fastened thereto. This normally keeps the top of tube 19 closed, opening it only when sufficient pressure is developed in the tube to lift collar 22 off its seat. Valve rod 24 extends slidably through casting 16, cage 25 serving also as a guide and to limit the upward motion of collar 22. Below the lowest screen or perforated member 18 is a distributing space 26 in casting 17 into which the oil is forced from passage 27 which in turn is connected by pipe 28 to the pressure side of a lubricating system (not shown). In casting 17, below the level of the top of passage 27 is a sump 29. A coarsely perforated plate 52 is between sump 29 and distributing space 26. Plate 52 keeps whatever turbulence there is in space 26 from picking up sludge which may have reached sump 29. To a certain extent the filter is self cleaning, in that when the engine is at rest and there is no flow through the lubricating system, the filtered out particles will drop down from the screens, and as the lower screens have larger openings than those above them, the particles will tend to drop through successively lower screens until they reach the sump. A layer of felt or felt screen 70 is sewed or otherwise fastened to the underside of a perforated plate 33 located in shell 14 above the top screen 18. It acts as a support for felt screen 70. I prefer to use this felt screen, although it may be omitted. A passage 30 passes through the bottom of casting 17 from sump 29 and leads to the sludge receptacle 31. The lower end of casting 17 is threaded to receive the threaded neck of sludge receptacle 31. A vent 32 is provided in receptacle 31. A passage 34 leads from space 35 in casting 16 to tube 36. The lower end of tube 36 connects with passage 37 in casting 17. A tube 38 leads from passage 37 back to the lubricating system. A rotatably mounted valve stem 39 extends across passages 27, 30 and 37 and can block them when turned in certain positions. In the position of valve stem 39 shown in Fig. 1, its ports 40 and 41 keep open passages 27 and 37 respectively, whereas port 42 is turned at right angles to passage 30 so that the latter is blocked off by the valve stem. Handle 43 is fastened to the outer end of valve stem 39. In the position shown, handle 43 blocks off the lower end of pipe 44, the upper end of said pipe entering space 35 for a purpose which will be explained hereafter. Lever 45 is pivotally mounted on the top of casting 16 in such position that it rests on top of valve rod 24. When the pressure in bypass or tube 19 is great enough to raise valve rod 24, it pushes up the outer end of lever 45 to which chain 46 is attached. The lower end of chain 46 is attached to handle 43, slack in the chain being provided that the handle can be turned 90 degrees as shown by the dot and dash lines and that the lever can rise. The hub 47 of lever 45 is provided with recesses 48, Figs. 1 and 4, adapted to be engaged by spring catch 49, so that lever 45 will remain in its extreme upper and lower positions when pushed there. The upper end of a flexible label 50 is attached to lever 45, while its lower end is fixed to casting 16. When lever 45 is in its upper position, as shown in dot and dash lines in Fig. 1, label 50 is extended to show that the filter requires cleaning. The label remains extended due to catch 49, even when the motor stops and there is no pressure in the lubricating system.

In the normal operation of the filter, valve stem 39 is set as shown in Figs. 1 and 2. Oil then passes from the pressure side of the lubricating system, through pipe 28 into passage 27, distributing space 26, screens 18, felt screen 70, space 35, passage 34, tube 36, passage 37, tube 38 back to the lubricating system. When continued flow of the oil through the screens causes them to clog from the accumulation of sludge, the pressure in chamber 51 increases until it pushes up valve plug 20. Before flutes 21 reach the top of bypass 19, no oil escapes from it, but lever 45 is pushed up displaying label 50 as shown by the dot and dash lines in Fig. 1 indicating that the filter needs cleaning. Further increase in pressure by a further increase of sludge on screens 18 forces plug 20 up far enough to expose flutes 21, as shown in Fig. 5, allowing the oil to flow through bypass 19, tube 36 and back to the lubricating system. In order to clean the screens, which are now practically inoperative, handle 43 is turned 90 degrees. This makes chain 46 taut, pulling down lever 45 and holding down valve collar 22 to keep bypass 19 closed against upward pressure, it being understood at this time that the engine is stopped and that the lubricating system, therefore, is not sending any oil under pressure into pipe 28. Turning valve handle 43, exposes the lower end of pipe 44 for the introduction of cleaning fluid, which may be air, clean air, kerosene, soap solution, or other suitable fluid. During the normal operation of the filter, the lower end of pipe 44 is blocked off by handle 43, so that no cleaning fluid can be introduced into the filter at this time when it would enter the lubricating system. When handle 43 is turned, port 42 is turned to open passage 30 for discharge from sump 29 into sludge receptacle 31, while ports 41 and 40 are turned across passages 37 and 27, so that valve stem 39 blocks them, completely cutting off the filter from the lubricating system. Air or other fluid is now forced into pipe 44, from whence it passes into space 35 and down through screens 18 into sump 29 and receptacle 31 carrying with it the sludge from the screens. As the interstices increase in size for the successively lower screens, the smaller particles originally caught by the screens above will be more readily enabled to pass through the lower screens. When sufficient cleaning has been done, handle 43 is returned to its operating position as shown in Figs. 1 and 2 and the filter is again in series with the lubricating system for its normal filtering action. Pipe or air connection 44 has inside of it (not seen) the usual air check valve, as on a tire, permitting the ingress of air or other fluid, but not its egress.

Instead of using the assembly shown in Figs. 1 and 6 for filter chamber 51, one containing porous filling material 54 as shown in Fig. 5 may be used. The chamber is divided into compartments by wide meshed screens 53. Between each pair of screens is retained the porous filling material 54. This material may be granular or of cellulosic fiber; the filling material in the compartment nearest the top of chamber 51 is more compact and has smaller pores or interstices than the one next below it, and in each succeeding chamber below, the filling material is successively less compact with successively larger pores The nearer the top a compartment is, the smaller its depth is. The assembly of Fig. 5 when used in the filter device as a whole, acts as previously described for Figs. 1–4 and 6.

In the form of filter shown in Figs. 9, 10 and 11, instead of forcing cleaning fluid into the outlet side of chamber 51, suction is applied to the sump side of said chamber to suck out the impurities. As with the filter of Fig. 1, screens 18 and bypass 19 are provided, together with valve plug 20 and lever 45. The chain 46 between lever 45 and valve handle 43 is not needed as there is reduced pressure in chamber 51 during the time valve stem 55 is set for cleaning. Valve stem 55 is provided with ports 40, 41 and 42 for controlling the flow respectively through passages 27, 37 and 30. When the filter is in normal operation, valve stem 55 is set at 90 degrees from that shown in Fig. 9, in which case the ports will be turned as shown in Fig. 1, allowing flow through the filter from the pressure side of the lubricating system. With valve stem 55 set as shown in Fig. 9 the filter is in condition for cleaning. Sludge receptacle 56, Figs. 9 and 10, is provided with a spout 57. An injector tube 58, having a small orifice, is set with the orifice over the end of spout 57, giving rise to a region of low pressure there when air is forced through said tube from a source of air pressure, not shown. This causes air to be sucked from receptacle 56 and chamber 51. A relief check valve 59 allows air to enter chamber 51 but not to leave it. The sucking of air from chamber 51 pulls down filtered out particles from screens 18, the increase in size of the interstices of the successive screens facilitating the particles in reaching sump 29 and receptacle 56. A baffle 60 is provided in receptacle 56 to prevent the discharge of sludge therefrom. With valve stem 55 in the position shown for it in Fig. 9, the filter is cut off from the lubricating system.

A slot 61, Figs. 9 and 11, is provided in valve stem 55, extending from passage 37 to passage 27. The slot serves as a bypass of the filter, so that should the engine be running, oil will be permitted to flow through the lubricating system even though passages 27 and 37 are blocked off by valve stem 55. This is especially useful where the suction used for cleaning is derived from the intake manifold of the engine instead of using an injector tube. In Fig. 13, receptacle 156 is provided with a tube 62 which connects with the intake manifold.

The porous filling material type of assembly of Fig. 5 is also adapted for use in the suction cleaning type of filters of Figs. 9, 10 and 13. In cleaning this type of assembly, the suction first removes the filtered out particles from the portion of the porous mass nearest to the source of suction, clearing the way then for the particles farther removed.

In the type of filtering device of Fig. 12, the cleaning is done by sending the oil from the lubricating system through the filter chamber 51 in the reverse direction.

The construction of the device of Fig. 12 is the same as that shown in Fig. 9 except that relief valve 59 is omitted, and a port 63 is provided in valve stem 66, which leads from bypass 61 through a small passage 64 into passage 37 of casting 17. The sludge receptacle 31 is the same as that shown in Fig. 1. With valve stem 66 set as shown in Fig. 12, there is no flow of oil from the lubricating system to the inlet side of chamber 51 and out of the outlet side of the chamber back into the lubricating system. Instead, bypass 61 leads some of the oil from pipe 28, connected to the pressure side of the lubricating system, into port 63 and passages 64 and 37 leading to the outlet side of the chamber from whence it passes through screens 18 in the reverse direction for their cleaning. The rest of the oil passes from bypass 61 into tube 38 back to the lubricating system. The reverse flow finally leads to sludge receptacle 31. At the same time this reverse flow takes place, bypass 61 leads the rest of the oil back to the lubricating system through pipe 38. When valve stem 66 is turned 90 degrees from that shown, all flow through bypass 61 is cut off and the normal flow through the filter takes place from the pressure side of the lubricating system from pipe 28. The filter assembly of Fig. 5 can also be used in the type of device shown in Fig. 12.

Where consistent with the context, the term "oil" as used in the claims is intended to be broad enough to cover other suitable fluids.

I claim:

1. An oil filter comprising a housing enclosing a chamber, means in the chamber for filtering the oil, said chamber having an inlet from the pressure side of a lubricating system and an outlet to the system whereby oil is caused to pass through the filtering means, a pressure controlled device in said chamber mounted for reciprocal motion therein, said device moving in one direction with an increase in pressure in the chamber, and in the opposite direction with a decrease in said pressure, a telltale device, a member extending between said devices, said telltale device being moved by said pressure controlled device through the agency of said member to displayed position when the pressure increases beyond said predetermined amount due to the clogging of the filtering means, and detent mechanism for releasably holding the telltale means in displayed position when so set irrespective of motion of the pressure controlled device in said opposite direction when the pressure decreases.

2. An oil filtering device comprising a housing having a chamber therein with a normal inlet from the pressure side of a lubricating system and a normal outlet to the system, means in said chamber through which the oil is caused to flow normally on its way from said inlet to said outlet for filtering the oil, said chamber having in addition to said inlet and outlet, a cleanout inlet on the outlet side of the filtering means with its entrance on the outside of the housing, and a cleanout outlet on the inlet side of said means for discharging from said chamber, the cleanout inlet being adapted at its entrance to be connected removably to a source of cleaning fluid under pressure, cut-off means engaging the normal inlet, normal outlet and the cleanout outlet, permitting or blocking the flow through said latter inlet and outlets in accordance with the position in which it is set, and a handle outside of the housing and attached to the cut-off means for setting the latter in its several positions, in one of said positions the handle is located to block the entrance to the cleanout inlet preventing its connection to said source of cleaning fluid, and in another position the handle is sufficiently clear of the cleanout to permit said connection, said handle being adjacent to and blocking the entrance to the cleanout inlet, preventing thereby the introduction of cleaning fluid when the cut-off means is set in position to permit the normal flow through the normal inlet and normal outlet and to block the cleanout outlet, said cut-off means when it is desired to clean the filter means being set in position to cut off the normal flow of oil between the chamber and the lubricating system and to open the cleanout outlet, having its handle sufficiently clear of the entrance to the cleanout inlet to permit the latter to be connected to the source of cleaning fluid for receiving said fluid under pressure, said fluid when so received forcing its way through the filter means in a direction opposite from normal and out the cleanout outlet.

3. An oil filter as claimed in claim 2, having a pressure controlled device in its chamber mounted for reciprocal motion therein, said device moving in one direction with an increase in pressure in the chamber, and in the opposite direction with a decrease in said pressure, a telltale device, a member extending between said devices, said telltale device being moved to displayed position by said pressure controlled device through the agency of said member when the pressure increases beyond a predetermined amount due to the clogging of the filter means, detent mechanism for releasably holding the telltale device in displayed position when so set irrespective of the motion of the pressure controlled device in said opposite direction when the pressure decreases, and a flexible line connecting the handle of the cut-off means with the telltale device, said line being of such length to permit said telltale device to move to displayed position when the handle blocks off the cleanout inlet, said line pulling the telltale device to undisplayed position when the handle is moved to be clear of the entrance to the cleanout inlet.

4. An oil filtering device comprising a housing having a chamber therein with a normal inlet from the pressure side of a lubricating system and a normal outlet to the system, means in the chamber through which the oil is caused normally to flow on its way from said inlet to said outlet for filtering the oil, said chamber having also a cleanout inlet with its entrance on the outside of the housing, communicating with the chamber on the outlet side of the filtering means, and a cleanout outlet on the inlet side of said means for discharging from the chamber, the cleanout inlet adapted at its entrance to be connected removably to a source of cleaning fluid under pressure, valve means engaging the normal inlet, normal outlet and the cleanout outlet, permitting or blocking flow through said latter inlet and outlets in accordance with the position in which it is set, a handle on the valve means outside of the housing for setting the valve means in its several positions, in one of said positions the handle is located to block the entrance to the cleanout inlet preventing its connection to said source of cleaning fluid, and in another position the handle is sufficiently clear of the cleanout to permit said connection, said handle being adjacent to and blocking the entrance to the cleanout inlet when the valve means is set in position for normal flow, preventing thereby introduction of cleaning fluid, and being clear of said entrance to permit the latter to be connected to the source of cleaning fluid when the valve means is set to stop said normal flow and open the cleanout opening, a pressure controlled telltale device in communication with the inside of the chamber, moved to displayed position when the pressure in the chamber exceeds a predetermined amount, and a member connecting the handle with the telltale device, said handle moving the telltale device to undisplayed position when the handle is set to clear the entrance to the cleanout inlet.

MORRIS KATCHER.